US010622660B2

(12) United States Patent
Hershkowitz et al.

(10) Patent No.: US 10,622,660 B2
(45) Date of Patent: Apr. 14, 2020

(54) HOUSING FOR MULTIPLE FUEL CELL STACKS

(71) Applicant: ExxonMobil Research and Engineering Company, Annandale, NJ (US)

(72) Inventors: Frank Hershkowitz, Basking Ridge, NJ (US); Timothy A. Barckholtz, Whitehouse Station, NJ (US); Paul J. Berlowitz, Glen Gardner, NJ (US); Sandipan K. Das, Spring, TX (US); Thomas A. Badgwell, Clinton, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 329 days.

(21) Appl. No.: 15/091,842

(22) Filed: Apr. 6, 2016

(65) Prior Publication Data
US 2016/0315344 A1    Oct. 27, 2016

Related U.S. Application Data

(60) Provisional application No. 62/150,403, filed on Apr. 21, 2015.

(51) Int. Cl.
H01M 8/2465    (2016.01)
H01M 8/2457    (2016.01)
(Continued)

(52) U.S. Cl.
CPC ..... H01M 8/2465 (2013.01); H01M 8/04201 (2013.01); H01M 8/145 (2013.01);
(Continued)

(58) Field of Classification Search
CPC combination set(s) only.
See application file for complete search history.

(56) References Cited

U.S. PATENT DOCUMENTS 5,376,472 A * 12/1994 Hartvigsen ......... H01M 8/0247
429/458
5,376,473 A * 12/1994 Akagi ................. H01M 8/241
429/437

(Continued)

FOREIGN PATENT DOCUMENTS

EP    0757398 A1    7/1995
JP    57130380 A    8/1982

OTHER PUBLICATIONS

PCT/US2016/026139 Invitation to pay additional fees dated Jun. 13, 2016.

Primary Examiner — Kaity V Chandler
(74) Attorney, Agent, or Firm — Liza Negron; David M. Weisberg

(57) ABSTRACT

Systems and methods are provided for arranging processing units in a common volume to allow for processing of a fluid flow as part of a mass and/or heat transfer process. Fuel cells are examples of processing units that include separate flow paths for processing two input fluid flows with mass and/or heat transfer between the separate flow paths. The arrangements described herein can allow a gas phase fluid flow to be delivered to a first process flow path of processing units in a common volume. The gas phase fluid flow can be delivered in a relatively uniform manner without the use of an intervening manifold to distribute gas from the common volume into the processing units.

8 Claims, 4 Drawing Sheets

(51) Int. Cl.
　　　*H01M 8/0668*　　(2016.01)
　　　*H01M 8/14*　　　(2006.01)
　　　*H01M 8/2475*　　(2016.01)
　　　*H01M 8/04082*　 (2016.01)
　　　*H01M 8/249*　　 (2016.01)
　　　*H01M 8/2484*　　(2016.01)

(52) U.S. Cl.
　　　CPC ......... *H01M 8/249* (2013.01); *H01M 8/2457* (2016.02); *H01M 8/2475* (2013.01); *H01M 8/2484* (2016.02); *H01M 8/0668* (2013.01); *H01M 2008/147* (2013.01); *Y02E 60/526* (2013.01)

(56) References Cited

U.S. PATENT DOCUMENTS

| | | | | |
|---|---|---|---|---|
| 5,480,738 A * | 1/1996 | Elangovan | .......... | H01M 8/0625 429/423 |
| 5,549,982 A * | 8/1996 | Akagi | ................ | H01M 8/2425 429/456 |
| 5,688,610 A * | 11/1997 | Spaeh | .................. | H01M 8/247 429/471 |
| 5,776,421 A * | 7/1998 | Matsumura | ............ | B01J 12/007 422/601 |
| 6,368,739 B1 * | 4/2002 | Frost | ................... | H01M 8/0247 429/465 |
| 6,689,499 B2 * | 2/2004 | Gillett | ................ | H01M 8/249 429/429 |
| 8,741,500 B2 * | 6/2014 | Fujita | ................... | H01M 8/241 429/468 |
| 9,142,853 B2 * | 9/2015 | Muraoka | ............. | H01M 8/0215 |
| 2002/0076597 A1 * | 6/2002 | Chang | .................. | H01M 8/241 429/454 |
| 2006/0147771 A1 | 7/2006 | Russell et al. | | |
| 2007/0184310 A1 * | 8/2007 | Kim | .................... | H01M 8/0612 429/423 |
| 2015/0125771 A1 * | 5/2015 | Finnerty | ................ | B01J 12/007 429/423 |

* cited by examiner

HOUSING FOR MULTIPLE FUEL CELL STACKS

CROSS-REFERENCE TO RELATED APPLICATIONS

This application claims the benefit of provisional U.S. Ser. No. 62/150,403, filed Apr. 21, 2015, the entire contents of which are expressly incorporated by reference herein.

FIELD OF THE INVENTION

In various aspects, the invention is related to generating electricity and removing $CO_2$ from a $CO_2$-containing gas flow using molten carbonate fuel cells.

BACKGROUND OF THE INVENTION

Molten carbonate fuel cells utilize hydrogen and/or other fuels to generate electricity. The hydrogen may be provided by reforming methane or other reformable fuels in a steam reformer that is upstream of the fuel cell or within the fuel cell. Reformable fuels can encompass hydrocarbonaceous materials that can be reacted with steam and/or oxygen at elevated temperature and/or pressure to produce a gaseous product that comprises hydrogen. Alternatively or additionally, fuel can be reformed in the anode cell in a molten carbonate fuel cell, which can be operated to create conditions that are suitable for reforming fuels in the anode. Alternately or additionally, the reforming can occur both externally and internally to the fuel cell.

SUMMARY OF THE INVENTION

In various aspects, systems and methods are provided for arranging processing units in a common volume to allow for processing of a fluid flow as part of a mass and/or heat transfer process. Fuel cells are examples of processing units that include separate flow paths for processing two input fluid flows with mass and/or heat transfer between the separate flow paths. In the case of fuel cells, the processing can result in production of electrical power, but other types of processing units can also be employed. The arrangements described herein can allow a gas phase fluid flow to be delivered to a first process flow path of processing units in a common volume. The gas phase fluid flow can be delivered in a relatively uniform manner while reducing, minimizing, and/or eliminating the use of an intervening manifold to distribute gas from the common volume into the processing units.

DETAILED DESCRIPTION

Overview

Figure 1:
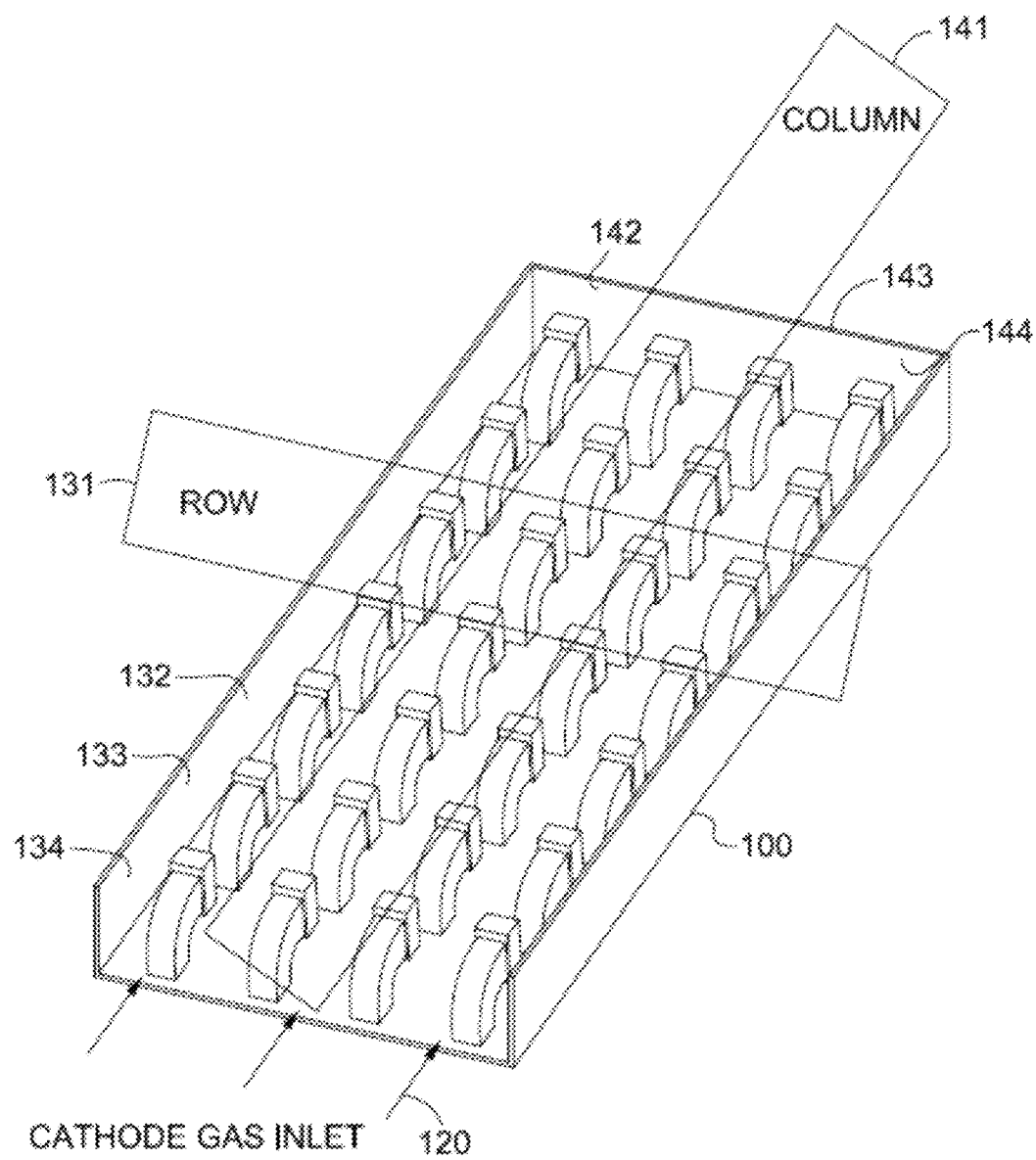
FIG. 1 schematically shows an arrangement of fuel cell stacks within a common volume.

In various aspects, methods and configurations are provided for using molten carbonate fuel cells (MCFCs) to process a large scale $CO_2$-containing stream, such as an exhaust stream from an industrial turbine or furnace. Current stack sizes for molten carbonate fuel cells are substantially smaller in processing capacity than the output flow of even a small scale industrial turbine. Instead of attempting to use a manifold to distribute such a large scale $CO_2$-containing stream to a large plurality of fuel cell stacks, the fuel cell stacks can be located in a common volume. By selecting a common volume with a suitable shape for containing a suitable arrangement of the fuel cell stacks, and by selecting an appropriate geometry for the transition between the conduit delivering the $CO_2$-containing stream and the common volume, the $CO_2$-containing stream can be distributed in a substantially uniform manner to the cathodes of the fuel cell stacks. This can allow for efficient processing of the $CO_2$ in the $CO_2$-containing stream as well as providing relatively uniform generation of power across the fuel cell stacks. Additionally or alternately, the suitable common volume shape, suitable fuel cell stack arrangement, and suitable geometry for the transition can allow thermal losses from the common volume and the transition to be reduced or minimized. The arrangements of fuel cell stacks described herein can be suitable for a common volume containing at least about 8 fuel cell stacks (or other processing units), or at least about 20 fuel cell stacks/processing units, or at least about 25, or at least about 35, or at least about 50, or at least about 100, and optionally up to hundreds or even thousands of fuel cell stacks, such as up to about 5000 fuel cell stacks.

In addition to generating electricity, molten carbonate fuel cells can be used for transport of $CO_2$ from a lower concentration input stream to a higher concentration output stream. For example, a low $CO_2$ concentration stream, such as an exhaust from a gas-powered turbine, can be used as a portion of the cathode inlet feed for the molten carbonate fuel cell. $CO_2$ can then be transported across the molten carbonate electrolyte in the fuel cell during the course of the reaction in the fuel cell for generating electricity. The resulting anode output stream from the fuel cell can then have a substantially higher $CO_2$ concentration than the original turbine exhaust and/or other source used for the cathode inlet stream. This type of transfer of $CO_2$ from a lower concentration stream to a higher concentration stream can provide a variety of potential benefits in situations where reducing $CO_2$ emissions is desirable.

Although pairing a $CO_2$ generating power source with molten carbonate fuel cells may be desirable, such a pairing can present a variety of problems. Some of the problems can be related to the mismatch between a typical commercial scale power generation source and a typical capacity for a commercial scale stack of molten carbonate fuel cells. For example, just on a relative power generation basis, a large scale commercial gas turbine (typically 100-400 MW) generates two to three orders of magnitude more power than currently available commercial scale MCFC stacks or stack arrays (300 kW to 1.4 MW). This leads to a similar type of disparity in the amount of $CO_2$ generated in the exhaust of a typical commercial scale gas turbine relative to the processing ability of currently available MCFC stacks or stack arrays. Even a small scale gas turbine, such as a 22 MW turbine, can require 24 conventional MCFC stacks in order to process the turbine exhaust for $CO_2$ removal.

One option for resolving this mismatch can be to provide a sufficiently large number of MCFC stacks to handle the exhaust from a turbine. However, due to the potentially two to three order of magnitude difference in relative size, providing a sufficient number of fuel cell stacks can correspond to having dozens, hundreds, or even possibly thousands of fuel cell stacks to handle the exhaust from a single power generation source.

If it is desired to use a large plurality of fuel cell stacks to process a $CO_2$-containing exhaust, the fuel cell stacks not only need to be present, but an additional difficulty can be distributing the exhaust from the power generation source to the fuel cell systems in a relatively equal manner. Otherwise, a portion of the fuel cells can operate in an inefficient mode and/or may not effectively contribute to processing of the $CO_2$-containing exhaust. To perform a substantially even distribution of a $CO_2$-containing exhaust using conventional methods, the pairing of the plurality of MCFC systems with the $CO_2$-generating power source could require a large and intricate manifold-style network of pipes, valves, interconnects, ducts, and/or other features in order to deliver portions of the exhaust to the cathodes of the various MCFC systems. While such a gas delivery network could potentially be constructed, the network can require substantial additional footprint and construction costs.

Another conventional solution for distributing a $CO_2$-containing gas to a plurality of MCFC cathode stacks can be to introduce the $CO_2$-containing gas into the middle of an enclosure, with a small number of surrounding fuel cell stacks. For example, the $CO_2$-containing gas can be introduced into an enclosure through the top or bottom of the enclosure using an conduit in the center of the top or bottom. A small number of MCFCs, such as four, can be arranged equidistant around the opening. Although this can produce a relatively even distribution of gas to the cathode inlets, the design is not practical for scaling to large numbers of MCFCs.

Still a further complication in using MCFCs to remove $CO_2$ from an exhaust (or other $CO_2$-containing stream can be related to reducing or minimizing loss of heat to the surrounding environment. One of the benefits of using MCFCs for $CO_2$ separation is that electrical energy is also produced. However, the operating temperature for a typical MCFC is typically around 600° C. Since an exhaust from a power generation source can often have a comparable (or possibly greater) temperature, it can be desirable to maintain the temperature of the exhaust during transport of the exhaust to the MCFCs. Otherwise, additional energy can be required to re-heat the $CO_2$-containing exhaust to the temperature required for operation of the MCFCs. Unfortunately, the numerous pipes, valves, interconnects, and other manifold parts for distributing an exhaust to the MCFCs can greatly increase the surface area and corresponding heat loss during transport. The need to replace such heat loss can greatly reduce the net power generated during operation of the MCFCs.

In various aspects, the use of and/or need for a manifold-style gas delivery network can be reduced or minimized by fluidly connecting a large exhaust source to a plurality of MCFC systems that are located in a common volume. Instead of attempting to distribute a $CO_2$-containing gas to the various MCFC cathodes in a proportional manner using a manifold-style network, the $CO_2$-containing gas can be introduced into the common volume by expanding the width of a conduit (or possibly a plurality of conduits, such as less than about 5) containing the $CO_2$-containing gas to roughly match the cross-sectional area of the area of the common volume prior to the gas entering the common volume. Once the $CO_2$-containing gas is in the common volume, the $CO_2$-containing gas can enter the cathodes of the fuel cell stacks and/or an enclosure surrounding a fuel cell stack directly from the common volume. This means that the $CO_2$-containing gas can be passed into the fuel cell stack (either cathode or surrounding enclosure) without having an intervening manifold to force a particular distribution of the $CO_2$-containing gas to the fuel cell stacks. Instead, the flow characteristics within the common volume can allow a coefficient of variation for the cathode inlet pressure for the various fuel cell stacks in the common volume to be less than a threshold value, so that similar amounts of $CO_2$-containing gas enter each fuel cell stack based on similarity in pressure. For convenience, the pressure upon entering the fuel cell stack, either by entering an enclosure surrounding a fuel cell stack or by directly entering cathodes of a fuel cell stack that are exposed to the common volume, is referred to herein as the cathode inlet pressure.

In some aspects, avoiding the use of an intervening manifold that forces a particular distribution of $CO_2$-containing gas to the plurality of fuel cell stacks in a common volume can correspond to having one or more manifolds where the manifolds are in fluid communication with only a subset of the fuel cell stacks in a common volume. In this type of aspect, any intervening manifold that initially receives gas from a conduit delivering the gas to the common volume can be in direct fluid communication with fewer than all of the plurality of fuel cell stacks. A manifold that initially receives gas from a conduit delivering the gas to the common volume is in contrast to a manifold that may exist within the common volume and receives an input flow of gas from a location inside of the common volume. Direct fluid communication between a manifold and a fuel cell stack is defined herein as fluid communication between a manifold and a fuel cell stack that does not involve passing through the common volume as part of the flow path between the manifold and the fuel cell stack. For example, one or more manifolds could be used to deliver $CO_2$-containing gas from a conduit carrying the $CO_2$-containing gas to a select group of the fuel cells. One option in this type of aspect can be to avoid the use of a single manifold that is in direct fluid communication with all of the fuel cell stacks in the plurality of fuel cell stacks in a common volume. Other options can include avoiding the use of a single manifold that is in direct fluid communication with at least about 75% the fuel cell stacks in a common volume, or at least about 50%, or at least about 33%, or at least about 25%. Still another option in this type of aspect can be to avoid the use of a plurality of manifolds that in combination provide direct fluid communication between a conduit containing a gas flow and all of the fuel cell stacks in a common volume. Yet other options can include avoiding the use of a plurality of manifolds that in combination are in direct fluid communication with at least about 75% of the fuel cell stacks in a common volume, or at least about 50%, or at least about 33%, or at least about 25%.

In aspects where this expansion of the conduit cross-section area is performed in a desirable manner, the distribution of the exhaust gas to the MCFCs can be improved while optionally also reducing or minimizing heat losses in the transition. Thus, instead of having to provide an intricate manifold-style network, the exhaust gas can be delivered to the MCFC cathodes in a common volume using a single (or alternatively a small plurality) of common ducts or conduits. Optionally but preferably, the gas delivered into the common volume can be delivered so that the transition region has an interface with a side surface of the common volume, as opposed to the top surface or bottom surface of the common volume. In this discussion, a side surface of the common volume is defined as a surface that intersects with the fuel cell stack plane, as further defined below. Introducing a gas flow via the top or bottom of a common volume could be beneficial in an effort to create radial symmetry in the position of fuel cell stacks relative to the gas flow. However, as the number of stacks increases, attempting to create such radial symmetry can lead to substantially larger enclosure volumes.

Still another benefit of introducing a $CO_2$-containing gas into a common volume for processing by a plurality of fuel cell stacks can be a reduction in the superficial velocity of the $CO_2$-containing gas. From a heat management perspective, it can be desirable to transport an exhaust gas from a combustion source (such as a turbine) to MCFCs for processing using a conduit with as small a surface area as practical. This can correspond to using a smaller diameter conduit (or a plurality of smaller diameter conduits) that can result in a higher velocity of gas flow within the conduit. For example, velocity of gas within a conduit can be at least about 10 m/s, or at least about 15 m/s, or at least about 20 m/s, such as up to about 40 m/s. Because the common volume can have a substantially larger cross-sectional area than the conduit(s), as the $CO_2$-containing gas passes through the transition region and is introduced into the common volume, the superficial velocity of the gas can be reduced. As a result, the superficial velocity of the $CO_2$-containing gas in the common volume can be about 10.0 m/s or less, or about 5.0 m/s or less, or about 3.0 m/s or less, or about 2.0 m/s or less, or about 1.0 m/s or less.

More generally, the arrangements within a common volume described herein can be used in various circumstances where it is desirable to have a gas flow that is processed by a plurality of processing units, where the gas flow is distributed to the plurality of processing units in a relatively uniform manner without use of a manifold. For example, although other types of fuel cells may not transport $CO_2$ across an electrolyte, fuel cells such as solid oxide fuel cells can process an input flow of $O_2$ that is received at the cathode of the solid oxide fuel cell. For large scale power generation using solid oxide fuel cells, rather than delivering $O_2$ to individual fuel cell stacks using a manifold, the solid oxide fuel cells can be arranged as described herein for processing of a flow of an $O_2$-containing stream that is delivered into a common volume.

Still more generally, for non-fuel cell related applications, the arrangements described herein can optionally but preferably be used for processing devices that are used to process two input fluid flows having different compositions using separate flow paths within the processing unit. The processing devices can be, for example, devices for performing heat and/or mass exchange between the two separate flows. In aspects where the processing devices can perform mass exchange between flows, the separate flow paths within the processing unit can optionally be in partial fluid communication, such as the partial fluid communication that corresponds to transport of ions across an electrolyte in a fuel cell. Fluid communication via a selectively permeable membrane can be another example of flow paths in partial fluid communication. The arrangements described herein can allow a gas phase product for one flow path to be delivered via a common volume without an intervening manifold, while the input fluid (gas or liquid) for the second flow path can be delivered via a separate manifold.

In order to facilitate explanation of the various aspects, the following definitions are provided.

Common volume: A common volume is defined herein as an enclosure containing a plurality of fuel cell stacks, such as molten carbonate fuel cell stacks. In this definition, the enclosure receives a $CO_2$-containing stream via one or more conduits that are connected to the enclosure via an interface region having a suitable expansion half-angle for expanding the flow into the enclosure. In some aspects, all of the $CO_2$-containing stream can exit the common volume as part of either a cathode exhaust or an anode exhaust stream. In other aspects, at portion of the $CO_2$-containing stream can exit the common volume as part of a stream separate from a cathode exhaust stream or anode exhaust stream.

Expansion half-angle and Transition Region: An expansion half-angle is defined herein according to the conventional definition for a half-angle when characterizing a transition region for expanding a conduit to interface with a common volume. In this discussion, the expansion half-angle corresponds to expansion in the lateral or width direction of the common volume. The diameter of a typical conduit for delivering a gas to a common volume can be any convenient size, such as a diameter of about 0.2 meters to about 3.0 meters, or about 0.3 meters to about 2.0 meters. The height of a typical fuel cell stack can be on the order of 4 meters or less. Even though the height of a typical fuel cell stack can be greater than a typical conduit diameter, the difference is not substantial with regard to expansion of the gas in the vertical direction while maintaining substantially uniform flow. Unless multiple layers of fuel cells are provided in the vertical (height) direction, uniformity of gas flow in the vertical direction can be of lower or minimal concern.

The expansion half-angle corresponds to half of the average expansion angle as a conduit increases in size from a first size for carrying a $CO_2$-containing stream to a second size prior to interfacing with a volume. The portion of a conduit corresponding to the expansion in volume can be referred to as a transition region. In some preferred aspects, the transition region can have a uniform expansion angle that is substantially the same as the average expansion angle. In other aspects, the expansion angle in the transition region can vary.

It is noted that the transition region may expand the conduit by an amount that is less than the full lateral extent or width of the common volume. Depending on the row and column arrangement of the fuel cell stacks, it can be possible to achieve sufficient flow uniformity by having a transition region that has a width at the interface with the common volume of at least about 25% of the width of the common volume, or at least about 50%, or at least about 60%, or at least about 70%, or at least about 80%, or at least about 90%, or at least about 99% (i.e., a width that is substantially similar to the width of the common volume). In this discussion, the width of the common volume can be defined as the width of the common volume side surface that forms the interface with the transition region.

Fuel Cell and Fuel Cell Components: In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel (with respect to flow) and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. Fuel cell stacks within a common enclosure would be considered to be within a single cathode stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically be "stacked" together in a rectangular array called a "fuel cell stack". This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current.

For the purposes of this invention, unless otherwise specified, the term "fuel cell" should be understood to also refer to and/or is defined as including a reference to a fuel cell stack composed of set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell".

Coefficient of Variation (CV): Coefficient of variation (CV) is known in the art as the standard deviation of a set of values divide by the mean of that set of values. It is frequently expressed as a percent (standard deviation as a percent of the mean).

Fuel Cell Stack Rows and Columns

In this discussion, the fuel cell stacks in a common volume can be characterized based on rows and columns relative to the direction of gas flow within the common volume. In some aspects, the net direction of gas flow within the common volume can be substantially aligned with the direction of gas flow within the cathodes of the fuel cells that process a majority of the gas flow. In other aspects, the direction of gas flow within the cathodes can be orthogonal to and/or independent of the net direction of gas flow within the common volume, and may even vary from stack to stack.

FIG. 1 shows an idealized version of laying out fuel cells in rows and columns. In FIG. 1, a common volume 100 is shown. The average direction of flow 120 is also shown. In the configuration shown in FIG. 1, the fuel cell stacks are aligned in rows 131-134 and aligned in columns 141-144. In this discussion, fuel cell stacks can be considered aligned when a line connects the average geometric centers of the fuel cell stacks. Such lines are typically substantially parallel to or perpendicular to the average direction of flow (as is the case in FIG. 1). In some aspects, alignment lines may at an angle to flow. Additionally or alternately, as shown in FIG. 1, if the enclosures for the fuel cell stacks in a common volume are substantially the same, fuel cell stacks can be considered aligned when the edges of two or more enclosures can be connected by a line that is substantially parallel to the average direction of gas flow. In a configuration such as FIG. 1, the rows and columns are aligned and easily identifiable. The number of rows and columns, represented herein with the symbols R and C, respectively, may be assigned by inspection.

Typically, stacks can be located within the enclosure at a similar elevation, that is, located such that the geometric center of each stack is located on a roughly horizontal plane within the enclosure. In order to provide a definite method for determining this "fuel cell stack plane", the fuel cell stack plane can be defined based on averages determined using the geometric centers for the fuel cell stacks. First, the average location of the geometric centers of the fuel cell stacks can be determined. This average geometric center location corresponds to a point within the common volume. The fuel cell stack plane is then determined based on a plane that satisfies the conditions of a) passing through the average geometric center location and b) having a minimum value for the sum of the square of the distances from each geometric center to the plane.

After determining the fuel cell stack plane, the intersection of the fuel cell stack plane with the walls defining the common volume may be referred to as the common volume outline shape. Typically this common volume outline shape can be a rectangle, but this is not necessary. The common volume outline shape may be a parallelogram, truncated cone, or other suitable shape. In the case of the regularly spaced stacks in a rectangular common volume, as shown in FIG. 1, it can be straightforward to identify numbers of rows and columns, for example simply by inspection. For the more general case, the following procedure can be employed:

In the general case, the x-axis can be placed on the fuel cell stack plane such that it passes through the geometric center of the stack that is closest to the origin of the flow, and perpendicular to the average direction of flow. The y axis can be placed on the fuel cell stack plane such that it passes through the geometric center of the stack that is furthest to the left (lowest x) from the perspective of the entering flow. For each stack (i), the distance from the x axis to the geometric center of the stack as it intersects the fuel cell stack plane can be defined as $y_i$, and the corresponding distance from the y axis as $x_1$. For the axes as defined above, all $y_1 \geq 0$, and all $x_1 \geq 0$.

In an aspect where rows/columns are determined using the general procedure, for each stack (i), the Column Direction Nearest Neighbor Stack can be identified as the nearest neighbor stack (j) for which $x_j > x_i$, and for which the absolute value of the distance from the y-axis is greater than the absolute value of the distance from the x-axis can be identified. For the absolute distance comparison from the axes, this can be expressed mathematically as $|x_j - x_i| > |y_j - y_i|$ based on the definitions for $x_i$ and $y_i$ above. In general, the nearest neighbor is the stack with minimum distance away, where the distance between two stacks i & j may be calculated as the square root of $((x_j-x_i)^2+(y_j-y_i)^2)$. In the case of the Column Direction Nearest Neighbor Stack, it is the nearest stack that also meets the two constraints of $x_j>x_i$, and $|x_j-x_i|>|y_j-y_i|$. This is the nearest stack in the quadrant to the right (looking in the direction of flow) of stack (i). For this stack, calculate $\Delta x_i$ as $(x_j-x_i)$. As defined above, this value must be positive. There may be no Column Direction Nearest Neighbor Stack for one or more stacks near the right side of the enclosure (looking in the direction of flow). The Characteristic Column Spacing (CCS) can then be defined as the average $\Delta x_i$, where the average considers only stacks for which there is a Column Direction Nearest Neighbor Stack. The (maximum) Row Width can then also be defined as $x_{MAX}$, where $x_{MAX}$ is the $x_i$ of the stack with largest value of $x_i$ (furthest to the right, looking in the direction of flow).

In a similar manner, for each stack (i), the Row Direction Nearest Neighbor Stack can be identified as the nearest neighbor stack (k) for which $y_k>y_i$, and $|y_k-y_i|>|x_k-x_i|$. Calculate $\Delta y_i$ as $(y_k-y_i)$. As defined, this value can only be positive. There may be no Row Direction Nearest Neighbor Stack for one or more stacks near the downstream end of the enclosure. The Characteristic Row Spacing (CRS) can then be defined as the average $\Delta y_i$, where the average considers only stacks for which there is a Row Direction Nearest Neighbor Stack. The (maximum) Column Length can then also be defined as $y_{MAX}$, where $y_{MAX}$ is the $y_i$ of the stack with largest value of $y_i$ (furthest downstream in the average direction of flow).

Based on the above, the Characteristic Number of Rows ($R_C$) can be defined as $(y_{MAX}/CRS)+1$. The Characteristic Number of Columns ($C_C$) can similarly be defined as $(x_{MAX}/CCS)+1$. In the rare case where no stack has a Column Direction Nearest Neighbor Stack, this is an indication that there is only a single column, and $C_C$ can therefore be set to equal 1. Similarly, in the rare case where no stack has a Row Direction Nearest Neighbor Stack, this is an indication that there is only a single row, and $R_C$ can be set to equal 1. If there is no obvious R and C by inspection, the above method can be substituted for the purpose of this invention.

Figure 2:
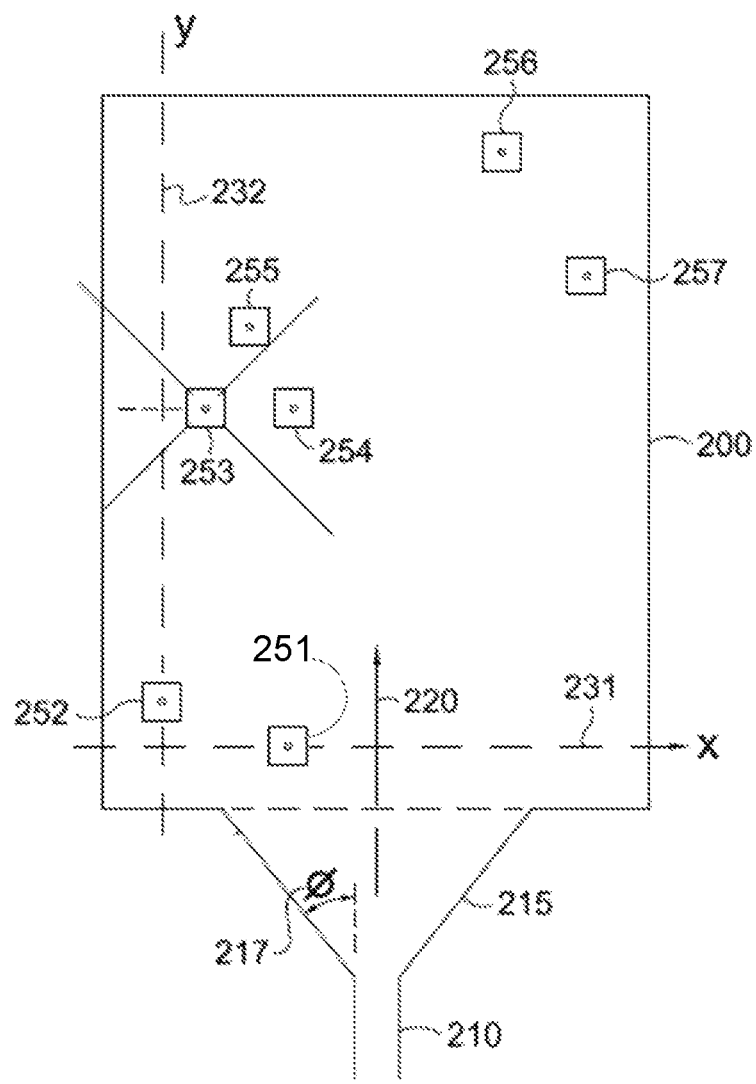
FIG. 2 schematically shows an alternative arrangement of fuel cell stacks within a common volume.

An example of how to determine the various quantities for calculating $R_C$ and $C_C$ as defined above is illustrated in FIG. 2. In FIG. 2, a common volume 200 is shown, along with conduit 210 and transition region 215, and average direction of flow 220. For the transition region 215, the expansion half-angle 217 is also shown. In FIG. 2, fuel cell stack 251 is the stack closest to the interface where the conduit 210 meets the transition 215. Thus, fuel cell stack 251 is closest to the original of the flow within the common volume. Using the general method described above, the x-axis 231 is defined by a) placing the x-axis in the fuel cell stack plane (not shown), b) including the geometric center of fuel cell stack 251 on the x-axis, and c) placing the x-axis so it is perpendicular to the average direction of flow 220. Similarly, the y-axis 232 can be drawn by identifying fuel cell stack 252 as the leftmost (lowest x) stack, and then drawing the y-axis 232 as an axis perpendicular to x-axis 231 that both passes through the geometric center of fuel cell stack 252 and resides in the fuel cell stack plane. Fuel cell stacks 253, 254, and 255 are convenient examples of fuel cell stacks for demonstrating the nearest neighbor calculations described above. For the nearest neighbor calculations, fuel cell stack 253 can correspond to the stack designated as stack i above, fuel cell stack 254 can correspond to the Column Direction Nearest Neighbor Stack (designated as stack j above), and fuel cell stack 255 can correspond to the Row Direction Nearest Neighbor Stack (designated as stack k above). The diagonal lines associated with fuel cell stack 253 schematically illustrate the boundaries for where a geometric center of a stack can be located while still satisfying either the condition $|x_j-x_i|>|y_j-y_i|$ for a Column Direction Nearest Neighbor Stack such as stack 254, or the condition $|y_k-y_i|>|x_k-x_i|$ for a Row Direction Nearest Neighbor Stack, such as stack 255. Fuel cell stack 256 is the stack with the largest y value and therefore determines $y_{max}$. Similarly, fuel cell stack 257 is the stack with the largest x value and therefore determines $x_{max}$.

Operation of Single Fuel Cell Stack

In various aspects, a manifold is not used within the common volume to deliver $CO_2$-containing gas into the cathodes of the fuel cells in the fuel cell stacks. In order to clarify the gas flows within the common volume and the MCFCs, a description of the gas flow within a single fuel cell stack is described.

The flow path for the cathodes of the MCFCs can be substantially aligned with the primary direction of gas flow within the common volume; substantially perpendicular to the primary direction of gas flow; substantially random relative to the direction of gas flow; or any other convenient orientation. In some aspects, the orientation of the cathode flow path for each fuel cell stack can be oriented independently, with one or more pluralities of fuel cell stacks sharing a common alignment for cathode flow path, or possibly even no fuel cell stacks sharing a common alignment for cathode flow path.

The cathode exhaust can exit into a manifold or a plurality of manifolds that can remove the cathode exhaust from the common volume. The manifold(s) for the cathode exhausts for various stacks can, for example, be combined outside of the common volume for further processing. The cathode exhaust can be transported by a manifold to the exterior of the common volume in any convenient direction.

The anode flow path for the MCFCs can be in any convenient direction relative to the cathode flow path. For example, having an anode flow path that is orthogonal to the cathode flow path can be convenient for positioning the anode input flow manifold(s) and the anode output flow manifold(s) for the MCFCs. The manifold(s) for the anode exhausts for various stacks can, for example, be combined outside of the common volume for further processing. The anode exhaust can be transported by a manifold to the exterior of the common volume in any convenient direction.

Arrangement of Fuel Cell Stacks and Transition Region

The arrangement of molten carbonate fuel cells within a common volume can be based on a variety of considerations. Although any convenient method of organizing the fuel cell stacks could be used, in most aspects it can be desirable to organize the fuel cell stacks in rows and columns.

Another consideration can be to reduce or minimize the size of the common volume, as this can assist with reducing the perimeter surface area available for heat loss. Based on this consideration, it can be desirable to minimize the distance between adjacent fuel cell stacks both in rows and in columns. However, it can also be desirable to have a similar cathode inlet pressure for all of the MCFCs in the common volume. If the spacing between fuel cell stacks within a row is too small, this can increase the pressure drop for gas passing between the stacks to downstream locations. This additional pressure drop can tend to force additional gas to pass into the cathodes that are upstream from the additional pressure drop.

Still another group of considerations can be related to construction and maintenance of the fuel cells. Although reducing the volume of the enclosure may be beneficial from a heat management standpoint, it can be desirable to trade some efficiency for the ability to easily access the fuel cell stacks within a common volume. For example, it may be desirable to have sufficient space between the fuel cell stacks to allow a maintenance vehicle to pass between stacks. Other considerations could cause a still larger spacing between stacks to be desirable.

Based on one or more of the above considerations, fuel cell stacks can be organized in a manner that can improve uniformity in the pressure that is delivered to the cathode inlets of various stacks in a common volume; reduce or minimize the size of the common volume; maintain a sufficient distance between the fuel cells to avoid uneven flow; and/or a desired distance based on other considerations. The fuel cell stacks can be arranged so that the ratio of number of rows to number of columns is within a defined range. The defined range of row to column ratios (or R/C) can be beneficial for arranging fuel cells to have a desired amount of flow uniformity between the fuel cells while also balancing a desire for reducing or minimizing heat loss due to exposed surface area of the common volume and transition region.

In various aspects, the number of rows and the number of columns can be determined by inspection, or more generally the number of rows and number of columns can correspond to the values for the Characteristic Number of Rows $R_C$ and the Characteristic Number of Columns $C_C$, as described above. Based on the determined number of rows and columns, the ratio of rows to columns (R/C) for the fuel cell stacks in a common volume can be from about 0.1 to about 5.0, or about 0.1 to about 4.0, or about 0.2 to about 5.0, or about 0.2 to about 4.0, or about 0.2 to about 3.0, or about 0.2 to about 2.0, or about 0.3 to about 5.0, or about 0.3 to about 4.0, or about 0.3 to about 3.0, or about 0.3 to about 2.0.

The above row to column ratios can be beneficial in combination with expansion half-angles in the transition region of between about 15° and about 80°. Conventionally, when it is desirable to create uniform flow for a gas delivered from a conduit into a larger enclosure, an expansion half-angle of about 7.5° would be recommended, with a corresponding long, narrow common volume. Unfortunately, this conventional selection also leads to a maximized surface area. With common volume shapes that can help to reduce or minimize surface area (to reduce heat loss), it has been unexpectedly determined that other expansion angles can provide improved flow uniformity into the cathodes of the fuel cell stacks. In various aspects, the expansion half-angle of the transition region can be about 15° to about 80°, or about 20° to about 80°, or about 25° to about 80°, or about 30° to about 80°, or about 35° to about 80°, or about 40° to about 80°, or about 15° to about 75°, or about 20° to about 75°, or about 25° to about 75°, or about 30° to about 75°, or about 35° to about 75°, or about 40° to about 75°, or 15° to about 70°, or about 20° to about 70°, or about 25° to about 70°, or about 30° to about 70°, or about 35° to about 70°, or about 40° to about 70°.

By using a suitable arrangement of rows and columns of fuel cell stacks, in combination with a suitable expansion half-angle for the transition region, the cathodes of the fuel cell stacks in the common volume can be operated with a cathode inlet pressure that has a reduced or minimized coefficient of variation (CV), as defined above, while also reducing or minimizing perimeter surface area of the enclosure that is available for heat loss. In some aspects, the CV for the cathode inlet pressures for fuel cell stacks (or other processing units) within a common volume can be about 8.0% or less, or about 6.0% or less, or about 5.0% or less, or about 4.0% or less.

Additionally or alternately, for a fuel cell stack configuration having a specified row to column ratio, the coefficient of variation for the cathode inlet pressures can be dependent on the expansion half-angle of the transition region. In some aspects, it may be desirable to select an expansion half-angle for the transition region that is different from the expansion half-angle that can minimize the coefficient of variation for cathode inlet pressures in the common volume. A ratio can be determined of the CV at a selected expansion half-angle relative to the CV at the expansion half-angle that minimizes the CV. In such aspects, the ratio of CV values (selected versus minimum) can be about 2.0 or less, or about 1.8 or less, or about 1.6 or less, or about 1.5 or less, or about 1.4 or less.

Perimeter Surface Area of Common Volume and Transition Region Perimeter

Figure 3:
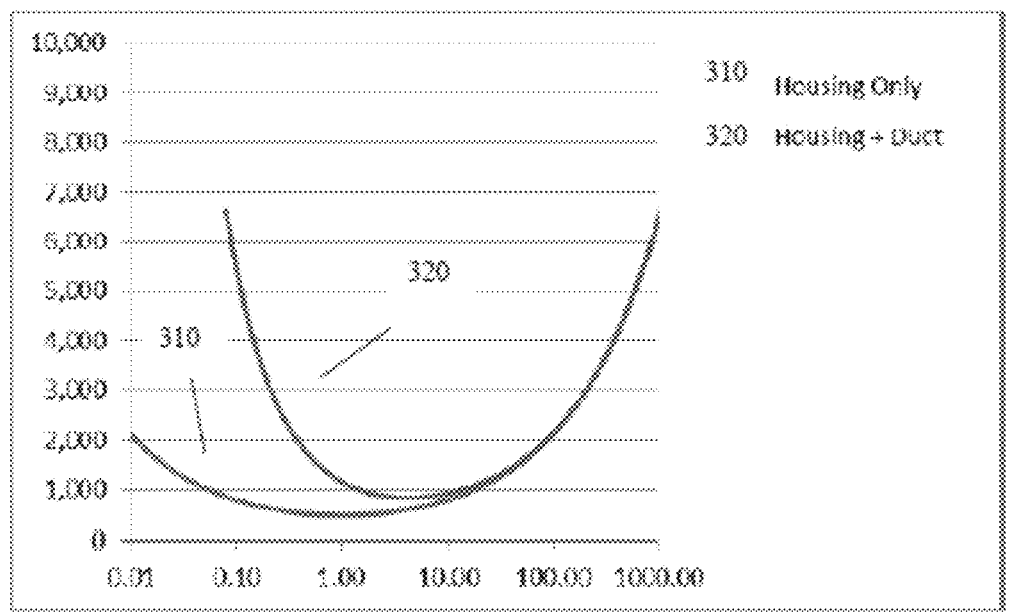
FIG. 3 shows perimeter surface area values for a common volume and corresponding transition region for various fuel cell stack arrangements.

In this example, demonstrates the differences between the shape for a common volume (and thus a corresponding arrangement of fuel cell stacks) that would be selected based on conventional design principles and a fuel cell stack arrangement according to the principles described herein. In FIG. 3, the external perimeter area for a common volume containing a number of fuel cell stacks is shown by curve 310. If just a common volume is considered, without a transition region, the minimum perimeter area can correspond to a square configuration. For example, for a volume containing 4 stacks, where each stack within the enclosure takes up a space having length and width equal to 1 length units, the stacks can be contained in a volume with a perimeter of 8 length units. In such a square configuration, the row to column ratio (R/C) for the fuel cell stacks can be about 1. This is in contrast to other arrangements, such as having all fuel cell stacks in a line. For a volume containing 4 such stacks, aligning as 4 rows and 1 column, or as 1 row and 4 columns, would lead to a perimeter area of 10. The corresponding R/C ratio would be 4.0 or 0.25, respectively.

Adding the transition region to the perimeter area calculation can alter the minimum perimeter shape for the common volume. The combined perimeter area for both a common volume and a corresponding transition region having an expansion half-angle of 7.5° is shown in curve 320. As noted above, an expansion half-angle of 7.5° corresponds to a conventional selection for a transition region between a conduit or pipe and a larger volume. A narrower common volume can reduce the length of the transition region and therefore reduce the overall amount of perimeter area. As a result, as shown by curve 320, the minimum combined perimeter area corresponds to a narrower common volume (higher R/C). According to conventional understanding, the minimum perimeter shown in curve 320 would produce a combination of optimized flow uniformity and minimum area for heat loss.

Figure 4:
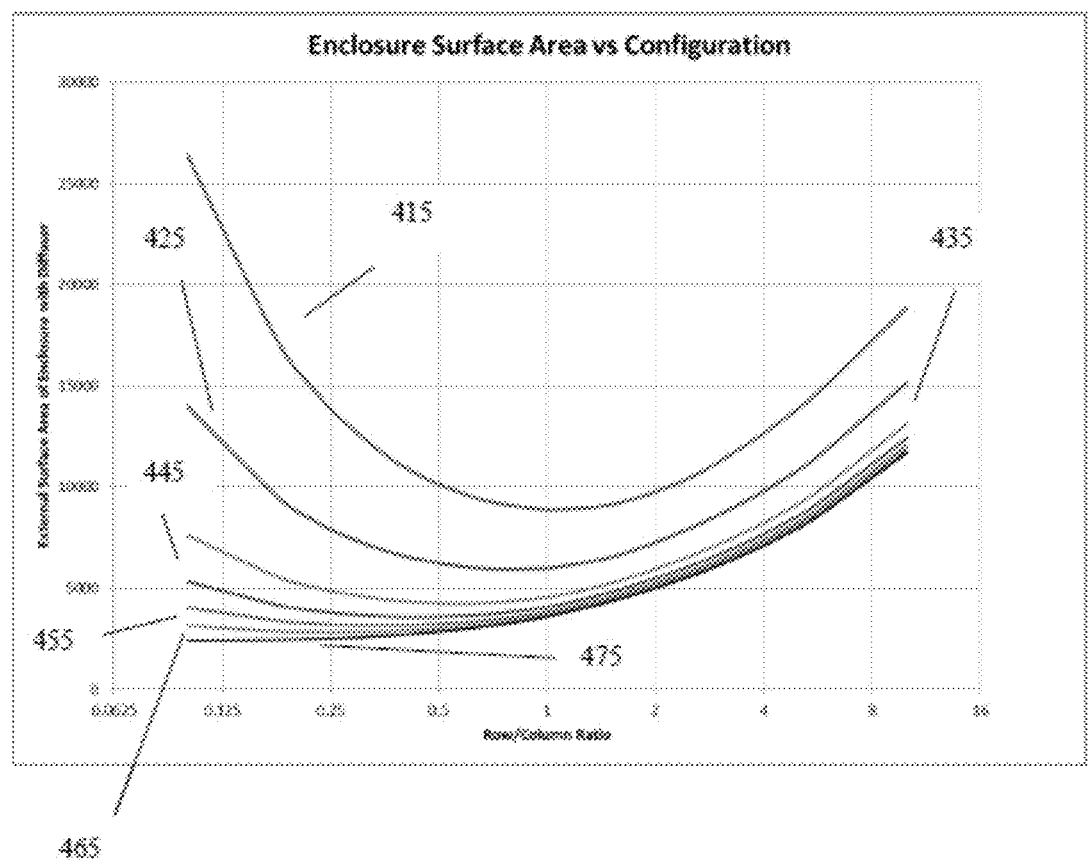
FIG. 4 shows perimeter surface area values for a common volume and corresponding transition region for various fuel cell stack arrangements.

It has been unexpectedly discovered that the conventional expansion half-angle for improvement of uniformity of flow does not correlate well with reducing or minimizing variations in cathode inlet pressure for larger numbers of fuel cell stacks arranged with relatively equal numbers of rows and columns. Instead, at larger expansion half-angles, it has been determined that arrangements of fuel cell stacks with row to column ratios of about 0.2 to about 5.0 can assist with reducing or minimizing the coefficient of variation in cathode inlet pressure between fuel cell stacks. As shown in FIG. 4, this determination also can result in a different selection of expansion half-angle for reducing or minimizing the perimeter area of a combined common volume and transition region.

Cathode Inlet Pressure Variations

FIG. 4 provides another option for considering the relationship between the row to column ratio for an arrangement of fuel cell stacks and the perimeter surface area for a combined common volume and transition region for containing the arrangement of fuel cell stacks. The example shown in FIG. 4 corresponds to an arrangement of 360 fuel cell stacks. In these curves, for each value for expansion half angle and R/C ratio, the calculation finds the minimum fuel cell stack spacing that can be achieved while still meeting a pressure drop specification of less than about 2"H$_2$O (about 0.5 kPa) over the length of the common volume. Using this fuel cell stack spacing, a perimeter surface area can be calculated for the enclosure corresponding to the common volume and the transition region. The curves shown in FIG. 4 correspond to transition region half angles of 7.5° (415), 15° (425), 30° (435), 45° (445), 60° (455), 75° (465), and 90° (475). As shown in FIG. 4, at an expansion half-angle of 7.5°, the additional perimeter surface area required by the transition region leads to substantially larger surface areas regardless of the row to column ratio for the fuel cells. As the expansion half-angle is increased, lower surface areas can be achieved.

FIG. 4 provides information regarding relative sizes for the total enclosure (common volume plus transition region) for housing an arrangement of fuel cells. As a complement to FIG. 4, the variation in cathode inlet pressure for fuel cell stacks in an arrangement can also be determined, such as by using computational fluid dynamics. Table 1 provides results from performing computational fluid dynamics modeling of various arrangements of fuel cell stacks and expansion half-angle values to determine differences between the maximum and minimum cathode inlet pressures for the fuel cell stacks. In these simulations, either 28 or 30 fuel cell stacks were arranged within a common volume. The stacks were arranged in rows and columns with sufficient spacing to avoid meaningful pressure drop for gas passing between adjacent fuel cell stacks, but otherwise with a reduced or minimized distance between neighbor fuel cell stacks. The fuel cell stacks were arranged in aligned rows and columns. For the gas flow in the simulations, the transition region expanded the gas flow from an initial conduit size to the full width of the common volume. The cathode inlets for the fuel cell stacks were arranged so that cathode flow is parallel to the average direction of gas flow, with inlets on the downstream side of the stack (the stack vs enclosure flow directions are opposing in this example). Pressure at all the cathode outlets are maintained at a constant value, representing a common downstream exhaust manifold.

Based on the simulations, the cathode flow rate for each of the fuel cell stacks in the common volume were determined, and the coefficient of variation determined for the set of stack flow rates. As noted above, coefficient of variation (CV) is known in the art as the standard deviation of a set of values divided by the mean of that set of values. It is frequently expressed as a percent (standard deviation as a percent of the mean).

TABLE 1

Cathode Inlet Pressure Coefficient of Variation

| Row × Column | R/C | Half-Angle (°) | CV (%) |
| --- | --- | --- | --- |
| 2 × 14 | 0.14 | 0 | 3.21 |
| 2 × 14 | 0.14 | 7.5 | 2.85 (minimum) |
| 2 × 14 | 0.14 | 15 | 3.52 |
| 4 × 7 | 0.57 | 7.5 | 6.21 |
| 4 × 7 | 0.57 | 15 | 5.87 |
| 4 × 7 | 0.57 | 45 | 4.66 (minimum) |
| 4 × 7 | 0.57 | 53 | 5.19 |
| 4 × 7 | 0.57 | 88 | 11.41 |
| 6 × 5 | 1.2 | 60 | 3.98 |
| 6 × 5 | 1.2 | 65 | 3.69 (minimum) |
| 6 × 5 | 1.2 | 75 | 4.34 |
| 6 × 5 | 1.2 | 88 | 8.67 |
| 7 × 4 | 1.75 | 7.5 | 10.11 |
| 7 × 4 | 1.75 | 45 | 7.26 |
| 7 × 4 | 1.75 | 75 | 4.73 |
| 7 × 4 | 1.75 | 80 | 4.31 (minimum) |
| 7 × 4 | 1.75 | 85 | 5.15 |

Evaluating either Table 1 or FIG. 4 separately can tend to lead to a result that is less favorable than evaluation of Table 1 and FIG. 4 together. For example, as shown in Table 1, at R/C ratios of less than 0.2, an expansion half-angle of 7.5° can lead to a low CV for the cathode inlet pressures in a common volume. However, as shown in FIG. 4, a small expansion half-angle with a low R/C ratio can result in minimum perimeter surface areas that are at least about 3 times larger than the perimeter surface area at a larger expansion half-angle and at an R/C ratio between about 0.2 and about 0.5. Thus, even though Table 1 indicates that R/C ratios less than 0.2 may be favorable for reducing differences in cathode inlet pressure, FIG. 4 shows that such R/C ratios can lead to excessive enclosure sizes and therefore increased difficulty in minimizing heat loss. By contrast, at the minimum perimeter area in FIG. 4 for a 7.5° expansion half angle, a 7.5° expansion half-angle would lead to larger CV in the cathode inlet pressures than many other options. FIG. 4 shows the minimum perimeter area for a 7.5° expansion half angle is at an R/C ratio of about 1. At R/C values near one, Table 1 shows that the minimum CV occurs at an expansion half angle between about 45° and about 65°.

As another example, the perimeter surface area values in FIG. 4 can suggest that a low R/C ratio would be favorable in conjunction with a large expansion half-angle, possibly approaching 90°. However, as shown in Table 1, selecting a small R/C ratio with a large expansion half-angle would likely lead to a large CV for the cathode inlet pressures, since the minimum CV occurs at an R/C value near 7.5°.

Evaluating Table 1 and FIG. 4 in conjunction with each other can lead to selection of an improve arrangement for fuel cell stacks. As shown in FIG. 4, selecting larger expansion half-angles can tend to reduce the required perimeter surface area for a fuel cell stack enclosure (common volume and transition region). Table 1 demonstrates that R/C values from about 0.2 to about 5.0, such as about 0.5 to about 2.0, can be suitable for reducing or minimizing the CV in cathode inlet pressures when an expansion half-angle of about 15° to about 80° is selected, or about 15° to about 70°, or about 20° to about 80°, or about 20° to about 70°. or about 30° to about 80°, or about 30° to about 70°.

Anode Inputs and Outputs

In various aspects of the invention, the MCFC array can be fed by a fuel received at the anode inlet that comprises, for example, both hydrogen and a hydrocarbon such as methane (or alternatively a hydrocarbonaceous or hydrocarbon-like compound that may contain heteroatoms different from C and H). Most of the methane (or other hydrocarbonaceous or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane. The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternately, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various C1-C4 hydrocarbons. This off-gas can be used as at least a portion of an anode input stream. Other refinery off-gas streams can additionally or alternatively be suitable for inclusion in an anode input stream, such as light ends (C1-C4) generated during cracking or other refinery processes. Still other suitable refinery streams can additionally or alternately include refinery streams containing CO or $CO_2$ that also contain $H_2$ and/or reformable fuel compounds.

Still other potential sources for an anode input can additionally or alternatively include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions.

In various aspects, the composition of the output stream from the anode can be impacted by several factors. Factors that can influence the anode output composition can include the composition of the input stream to the anode, the amount of current generated by the fuel cell, and/or the temperature at the exit of the anode. The temperature of at the anode exit can be relevant due to the equilibrium nature of the water gas shift reaction. In a typical anode, at least one of the plates forming the wall of the anode can be suitable for catalyzing the water gas shift reaction. As a result, if a) the composition of the anode input stream is known, b) the extent of reforming of reformable fuel in the anode input stream is known, and c) the amount of carbonate transported from the cathode to anode (corresponding to the amount of electrical current generated) is known, the composition of the anode output can be determined based on the equilibrium constant for the water gas shift reaction.

$$K_{eq}=[CO_2][H_2]/[CO][H_2O]$$

In the above equation, $K_{eq}$ is the equilibrium constant for the reaction at a given temperature and pressure, and [X] is the partial pressure of component X. Based on the water gas shift reaction, it can be noted that an increased $CO_2$ concentration in the anode input can tend to result in additional CO formation (at the expense of $H_2$) while an increased $H_2O$ concentration can tend to result in additional $H_2$ formation (at the expense of CO).

To determine the composition at the anode output, the composition of the anode input can be used as a starting point. This composition can then be modified to reflect the extent of reforming of any reformable fuels that can occur within the anode. Such reforming can reduce the hydrocarbon content of the anode input in exchange for increased hydrogen and $CO_2$. Next, based on the amount of electrical current generated, the amount of $H_2$ in the anode input can be reduced in exchange for additional $H_2O$ and $CO_2$. This composition can then be adjusted based on the equilibrium constant for the water gas shift reaction to determine the exit concentrations for $H_2$, CO, $CO_2$, and $H_2O$.

Table 2 shows the anode exhaust composition at different fuel utilizations for a typical type of fuel. The anode exhaust composition can reflect the combined result of the anode reforming reaction, water gas shift reaction, and the anode oxidation reaction. The output composition values in Table 2 were calculated by assuming an anode input composition with an about 2 to 1 ratio of steam ($H_2O$) to carbon (reformable fuel). The reformable fuel was assumed to be methane, which was assumed to be 100% reformed to hydrogen. The initial $CO_2$ and $H_2$ concentrations in the anode input were assumed to be negligible, while the input $N_2$ concentration was about 0.5%. The fuel utilization $U_f$ (as defined herein) was allowed to vary from about 35% to about 70% as shown in the table. The exit temperature for the fuel cell anode was assumed to be about 650° C. for purposes of determining the correct value for the equilibrium constant.

TABLE 2

Anode Exhaust Composition

| $U_f$ | % | 35% | 40% | 45% | 50% | 55% | 60% | 65% | 70% |
|---|---|---|---|---|---|---|---|---|---|
| | | | | Anode Exhaust Composition | | | | | |
| $H_2O$ | %, wet | 32.5% | 34.1% | 35.5% | 36.7% | 37.8% | 38.9% | 39.8% | 40.5% |
| $CO_2$ | %, wet | 26.7% | 29.4% | 32.0% | 34.5% | 36.9% | 39.3% | 41.5% | 43.8% |
| $H_2$ | %, wet | 29.4% | 26.0% | 22.9% | 20.0% | 17.3% | 14.8% | 12.5% | 10.4% |
| CO | %, wet | 10.8% | 10.0% | 9.2% | 8.4% | 7.5% | 6.7% | 5.8% | 4.9% |
| $N_2$ | %, wet | 0.5% | 0.5% | 0.5% | 0.4% | 0.4% | 0.4% | 0.4% | 0.4% |
| $CO_2$ | %, dry | 39.6% | 44.6% | 49.6% | 54.5% | 59.4% | 64.2% | 69.0% | 73.7% |
| $H_2$ | %, dry | 43.6% | 39.4% | 35.4% | 31.5% | 27.8% | 24.2% | 20.7% | 17.5% |
| CO | %, dry | 16.1% | 15.2% | 14.3% | 13.2% | 12.1% | 10.9% | 9.7% | 8.2% |
| $N_2$ | %, dry | 0.7% | 0.7% | 0.7% | 0.7% | 0.7% | 0.7% | 0.7% | 0.7% |
| $H_2$/CO | | 2.7 | 2.6 | 2.5 | 2.4 | 2.3 | 2.2 | 2.1 | 2.1 |
| ($H_2 - CO_2$)/ ($CO + CO_2$) | | 0.07 | −0.09 | −0.22 | −0.34 | −0.44 | −0.53 | −0.61 | −0.69 |

Table 2 shows anode output compositions for a particular set of conditions and anode input composition. More generally, in various aspects the anode output can include about 10 vol % to about 50 vol % $H_2O$. The amount of $H_2O$ can vary greatly, as $H_2O$ in the anode can be produced by the anode oxidation reaction. If an excess of $H_2O$ beyond what is needed for reforming is introduced into the anode, the excess $H_2O$ can typically pass through largely unreacted, with the exception of $H_2O$ consumed (or generated) due to fuel reforming and the water gas shift reaction. The $CO_2$ concentration in the anode output can also vary widely, such as from about 20 vol % to about 50 vol % $CO_2$. The amount of $CO_2$ can be influenced by both the amount of electrical current generated as well as the amount of $CO_2$ in the anode input flow. The amount of $H_2$ in the anode output can additionally or alternately be from about 10 vol % $H_2$ to about 50 vol % $H_2$, depending on the fuel utilization in the anode. At the anode output, the amount of CO can be from about 5 vol % to about 20 vol %. It is noted that the amount of CO relative to the amount of $H_2$ in the anode output for a given fuel cell can be determined in part by the equilibrium constant for the water gas shift reaction at the temperature and pressure present in the fuel cell. The anode output can further additionally or alternately include 5 vol % or less of various other components, such as $N_2$, $CH_4$ (or other unreacted carbon-containing fuels), and/or other components.

Optionally, one or more water gas shift reaction stages can be included after the anode output to convert CO and $H_2O$ in the anode output into $CO_2$ and $H_2$, if desired. The amount of $H_2$ present in the anode output can be increased, for example, by using a water gas shift reactor at lower temperature to convert $H_2O$ and CO present in the anode output into $H_2$ and $CO_2$. Alternatively, the temperature can be raised and the water-gas shift reaction can be reversed, producing more CO and $H_2O$ from $H_2$ and $CO_2$. Water is an expected output of the reaction occurring at the anode, so the anode output can typically have an excess of $H_2O$ relative to the amount of CO present in the anode output. Alternatively, $H_2O$ can be added to the stream after the anode exit but before the water gas shift reaction. CO can be present in the anode output due to incomplete carbon conversion during reforming and/or due to the equilibrium balancing reactions between $H_2O$, CO, $H_2$, and $CO_2$ (i.e., the water-gas shift equilibrium) under either reforming conditions or the conditions present during the anode reaction. A water gas shift reactor can be operated under conditions to drive the equilibrium further in the direction of forming $CO_2$ and $H_2$ at the expense of CO and $H_2O$. Higher temperatures can tend to favor the formation of CO and $H_2O$. Thus, one option for operating the water gas shift reactor can be to expose the anode output stream to a suitable catalyst, such as a catalyst including iron oxide, zinc oxide, copper on zinc oxide, or the like, at a suitable temperature, e.g., between about 190° C. to about 210° C. Optionally, the water-gas shift reactor can include two stages for reducing the CO concentration in an anode output stream, with a first higher temperature stage operated at a temperature from at least about 300° C. to about 375° C. and a second lower temperature stage operated at a temperature of about 225° C. or less, such as from about 122° C. to about 210° C. In addition to increasing the amount of $H_2$ present in the anode output, the water-gas shift reaction can additionally or alternately increase the amount of $CO_2$ at the expense of CO. This can exchange difficult-to-remove carbon monoxide (CO) for carbon dioxide, which can be more readily removed by condensation (e.g., cryogenic removal), chemical reaction (such as amine removal), and/or other $CO_2$ removal methods. Additionally or alternately, it may be desirable to increase the CO content present in the anode exhaust in order to achieve a desired ratio of $H_2$ to CO.

After passing through the optional water gas shift reaction stage, the anode output can be passed through one or more separation stages for removal of water and/or $CO_2$ from the anode output stream. For example, one or more $CO_2$ output streams can be formed by performing $CO_2$ separation on the anode output using one or more methods individually or in combination. Such methods can be used to generate $CO_2$ output stream(s) having a $CO_2$ content of 90 vol % or greater, such as at least 95% vol % $CO_2$, or at least 98 vol % $CO_2$. Such methods can recover about at least about 70% of the $CO_2$ content of the anode output, such as at least about 80% of the $CO_2$ content of the anode output, or at least about 90%. Alternatively, in some aspects it may be desirable to recover only a portion of the $CO_2$ within an anode output stream, with the recovered portion of $CO_2$ being about 33% to about 90% of the $CO_2$ in the anode output, such as at least about 40%, or at least about 50%. For example, it may be desirable to retain some $CO_2$ in the anode output flow so that a desired composition can be achieved in a subsequent water gas shift stage. Suitable separation methods may comprise use of a physical solvent (e.g., Selexol™ or Rectisol™); amines or other bases (e.g., MEA or MDEA); refrigeration (e.g., cryogenic separation); pressure swing adsorption; vacuum swing adsorption; and combinations thereof. A cryogenic $CO_2$ separator can be an example of a suitable separator. As the anode output is cooled, the majority of the water in the anode output can be separated out as a condensed (liquid) phase. Further cooling and/or pressurizing of the water-depleted anode output flow can then separate high purity $CO_2$, as the other remaining components in the anode output flow (such as $H_2$, $N_2$, $CH_4$) do not tend to readily form condensed phases. A cryogenic $CO_2$ separator can recover between about 33% and about 90% of the $CO_2$ present in a flow, depending on the operating conditions.

Removal of water from the anode exhaust to form one or more water output streams can also be beneficial, whether prior to, during, or after performing $CO_2$ separation. The amount of water in the anode output can vary depending on operating conditions selected. For example, the steam-to-carbon ratio established at the anode inlet can affect the water content in the anode exhaust, with high steam-to-carbon ratios typically resulting in a large amount of water that can pass through the anode unreacted and/or reacted only due to the water gas shift equilibrium in the anode. Depending on the aspect, the water content in the anode exhaust can correspond to up to about 30% or more of the volume in the anode exhaust. Additionally or alternately, the water content can be about 80% or less of the volume of the anode exhaust. While such water can be removed by compression and/or cooling with resulting condensation, the removal of this water can require extra compressor power and/or heat exchange surface area and excessive cooling water. One beneficial way to remove a portion of this excess water can be based on use of an adsorbent bed that can capture the humidity from the moist anode effluent and can then be 'regenerated' using dry anode feed gas, in order to provide additional water for the anode feed. HVAC-style (heating, ventilation, and air conditioning) adsorption wheels design can be applicable, because anode exhaust and inlet can be similar in pressure, and minor leakage from one stream to the other can have minimal impact on the overall process. In embodiments where $CO_2$ removal is performed using a cryogenic process, removal of water prior to or during $CO_2$ removal may be desirable, including removal by triethyleneglycol (TEG) system and/or desiccants. By contrast, if an amine wash is used for $CO_2$ removal, water can be removed from the anode exhaust downstream from the $CO_2$ removal stage.

Alternately or in addition to a $CO_2$ output stream and/or a water output stream, the anode output can be used to form one or more product streams containing a desired chemical or fuel product. Such a product stream or streams can correspond to a syngas stream, a hydrogen stream, or both syngas product and hydrogen product streams. For example, a hydrogen product stream containing at least about 70 vol % $H_2$, such as at least about 90 vol % $H_2$ or at least about 95 vol % $H_2$, can be formed. Additionally or alternately, a syngas stream containing at least about 70 vol % of $H_2$ and CO combined, such as at least about 90 vol % of $H_2$ and CO can be formed. The one or more product streams can have a gas volume corresponding to at least about 75% of the combined $H_2$ and CO gas volumes in the anode output, such as at least about 85% or at least about 90% of the combined $H_2$ and CO gas volumes. It is noted that the relative amounts of $H_2$ and CO in the products streams may differ from the $H_2$ to CO ratio in the anode output based on use of water gas shift reaction stages to convert between the products.

In some aspects, it can be desirable to remove or separate a portion of the $H_2$ present in the anode output. For example, in some aspects the $H_2$ to CO ratio in the anode exhaust can be at least about 3.0:1. By contrast, processes that make use of syngas, such as Fischer-Tropsch synthesis, may consume $H_2$ and CO in a different ratio, such as a ratio that is closer to 2:1. One alternative can be to use a water gas shift reaction to modify the content of the anode output to have an $H_2$ to CO ratio closer to a desired syngas composition. Another alternative can be to use a membrane separation to remove a portion of the $H_2$ present in the anode output to achieve a desired ratio of $H_2$ and CO, or still alternately to use a combination of membrane separation and water gas shift reactions. One advantage of using a membrane separation to remove only a portion of the $H_2$ in the anode output can be that the desired separation can be performed under relatively mild conditions. Since one goal can be to produce a retentate that still has a substantial $H_2$ content, a permeate of high purity hydrogen can be generated by membrane separation without requiring severe conditions. For example, rather than having a pressure on the permeate side of the membrane of about 100 kPaa or less (such as ambient pressure), the permeate side can be at an elevated pressure relative to ambient while still having sufficient driving force to perform the membrane separation. Additionally or alternately, a sweep gas such as methane can be used to provide a driving force for the membrane separation. This can reduce the purity of the $H_2$ permeate stream, but may be advantageous, depending on the desired use for the permeate stream.

In various aspects of the invention, at least a portion of the anode exhaust stream (preferably after separation of $CO_2$ and/or $H_2O$) can be used as a feed for a process external to the fuel cell and associated reforming stages. In various aspects, the anode exhaust can have a ratio of $H_2$ to CO of about 1.5:1 to about 10:1, such as at least about 3.0:1, or at least about 4.0:1, or at least about 5.0:1. A syngas stream can be generated or withdrawn from the anode exhaust. The anode exhaust gas, optionally after separation of $CO_2$ and/or $H_2O$, and optionally after performing a water gas shift reaction and/or a membrane separation to remove excess hydrogen, can correspond to a stream containing substantial portions of $H_2$ and/or CO. For a stream with a relatively low content of CO, such as a stream where the ratio of $H_2$ to CO is at least about 3:1, the anode exhaust can be suitable for use as an $H_2$ feed. Examples of processes that could benefit from an $H_2$ feed can include, but are not limited to, refinery processes, an ammonia synthesis plant, or a turbine in a (different) power generation system, or combinations thereof. Depending on the application, still lower $CO_2$ contents can be desirable. For a stream with an $H_2$-to-CO ratio of less than about 2.2 to 1 and greater than about 1.9 to 1, the stream can be suitable for use as a syngas feed. Examples of processes that could benefit from a syngas feed can include, but are not limited to, a gas-to-liquids plant (such as a plant using a Fischer-Tropsch process with a non-shifting catalyst) and/or a methanol synthesis plant. The amount of the anode exhaust used as a feed for an external process can be any convenient amount. Optionally, when a portion of the anode exhaust is used as a feed for an external process, a second portion of the anode exhaust can be recycled to the anode input and/or recycled to the combustion zone for a combustion-powered generator.

Cathode Inputs and Outputs

In a molten carbonate fuel cell, the transport of carbonate ions across the electrolyte in the fuel cell can provide a method for transporting $CO_2$ from a first flow path to a second flow path, where the transport method can allow transport from a lower concentration (the cathode) to a higher concentration (the anode), which can thus facilitate capture of $CO_2$. Part of the selectivity of the fuel cell for $CO_2$ separation can be based on the electrochemical reactions allowing the cell to generate electrical power. For nonreactive species (such as $N_2$) that effectively do not participate in the electrochemical reactions within the fuel cell, there can be an insignificant amount of reaction and transport from cathode to anode. By contrast, the potential (voltage) difference between the cathode and anode can provide a strong driving force for transport of carbonate ions across the fuel cell. As a result, the transport of carbonate ions in the molten carbonate fuel cell can allow $CO_2$ to be transported from the cathode (lower $CO_2$ concentration) to the anode (higher $CO_2$ concentration) with relatively high selectivity. However, a challenge in using molten carbonate fuel cells for carbon dioxide removal can be that the fuel cells have limited ability to remove carbon dioxide from relatively dilute cathode feeds. The voltage and/or power generated by a carbonate fuel cell can start to drop rapidly as the $CO_2$ concentration falls below about 2.0 vol %. As the $CO_2$ concentration drops further, e.g., to below about 1.0 vol %, at some point the voltage across the fuel cell can become low enough that little or no further transport of carbonate may occur and the fuel cell ceases to function. Thus, at least some $CO_2$ is likely to be present in the exhaust gas from the cathode stage of a fuel cell under commercially viable operating conditions.

The amount of carbon dioxide delivered to the fuel cell cathode(s) can be determined based on the $CO_2$ content of a source for the cathode inlet. One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air). To a first approximation, the $CO_2$ content of the output flow from a combustion source can be a minor portion of the flow. Even for a higher $CO_2$ content exhaust flow, such as the output from a coal-fired combustion source, the $CO_2$ content from most commercial coal-fired power plants can be about 15 vol % or less. More generally, the $CO_2$ content of an output or exhaust flow from a combustion source can be at least about 1.5 vol %, or at least about 1.6 vol %, or at least about 1.7 vol %, or at least about 1.8 vol %, or at least about 1.9 vol %, or at least greater 2 vol %, or at least about 4 vol %, or at least about 5 vol %, or at least about 6 vol %, or at least about 8 vol %. Additionally or alternately, the $CO_2$ content of an output or exhaust flow from a combustion source can be about 20 vol % or less, such as about 15 vol % or less, or about 12 vol % or less, or about 10 vol % or less, or about 9 vol % or less, or about 8 vol % or less, or about 7 vol % or less, or about 6.5 vol % or less, or about 6 vol % or less, or about 5.5 vol % or less, or about 5 vol % or less, or about 4.5 vol % or less. The concentrations given above are on a dry basis. It is noted that the lower $CO_2$ content values can be present in the exhaust from some natural gas or methane combustion sources, such as generators that are part of a power generation system that may or may not include an exhaust gas recycle loop.

Other potential sources for a cathode input stream can additionally or alternately include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternately be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

For various types of $CO_2$-containing streams from sources other than combustion sources, the $CO_2$ content of the stream can vary widely. The $CO_2$ content of an input stream to a cathode can contain at least about 2 vol % of $CO_2$, such as at least about 4 vol %, or at least about 5 vol %, or at least about 6 vol %, or at least about 8 vol %. Additionally or alternately, the $CO_2$ content of an input stream to a cathode can be about 30 vol % or less, such as about 25 vol % or less, or about 20 vol % or less, or about 15 vol % or less, or about 10 vol % or less, or about 8 vol % or less, or about 6 vol % or less, or about 4 vol % or less. For some still higher $CO_2$ content streams, the $CO_2$ content can be greater than about 30 vol %, such as a stream substantially composed of $CO_2$ with only incidental amounts of other compounds. As an example, a gas-fired turbine without exhaust gas recycle can produce an exhaust stream with a $CO_2$ content of approximately 4.2 vol %. With EGR, a gas-fired turbine can produce an exhaust stream with a $CO_2$ content of about 6-8 vol %. Stoichiometric combustion of methane can produce an exhaust stream with a $CO_2$ content of about 11 vol %. Combustion of coal can produce an exhaust stream with a $CO_2$ content of about 15-20 vol %. Fired heaters using refinery off-gas can produce an exhaust stream with a $CO_2$ content of about 12-15 vol %. A gas turbine operated on a low BTU gas without any EGR can produce an exhaust stream with a $CO_2$ content of ~12 vol %.

In addition to $CO_2$, a cathode input stream can include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternately, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen (NOx) and/or sulfur (SOx), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

In addition to the reaction to form carbonate ions for transport across the electrolyte, the conditions in the cathode can also be suitable for conversion of nitrogen oxides into nitrate and/or nitrate ions. Hereinafter, only nitrate ions will be referred to for convenience. The resulting nitrate ions can also be transported across the electrolyte for reaction in the anode. NOx concentrations in a cathode input stream can typically be on the order of ppm, so this nitrate transport reaction can have a minimal impact on the amount of carbonate transported across the electrolyte. However, this method of NOx removal can be beneficial for cathode input streams based on combustion exhausts from gas turbines, as this can provide a mechanism for reducing NOx emissions. The conditions in the cathode can additionally or alternately be suitable for conversion of unburned hydrocarbons (in combination with $O_2$ in the cathode input stream) to typical combustion products, such as $CO_2$ and $H_2O$.

A suitable temperature for operation of an MCFC can be between about 450° C. and about 750° C., such as at least about 500° C., e.g., with an inlet temperature of about 550° C. and an outlet temperature of about 625° C. Prior to entering the cathode, heat can be added to or removed from the combustion exhaust, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at very low temperature, for example after a wet gas scrubber on a coal-fired boiler, in which case the combustion exhaust can be below about 100° C.

ADDITIONAL EMBODIMENTS

Embodiment 1

A method for processing a gas in a plurality of processing units, the processing units optionally comprising a plurality of fuel cells, comprising: optionally passing a gas from a conduit into an optional transition region, the optional transition region optionally having an expansion half-angle of about 15° to about 80°, the optional transition region being in fluid communication with the conduit and in fluid communication with a common volume, a width of the optional transition region at an interface with the common volume optionally being at least about 25% of a width of the common volume; introducing at least a portion of the gas from the conduit and/or the optional transition region into the common volume, the common volume containing a plurality of processing units, the plurality of processing units comprising a) at least about 20 processing units or b) at least about 8 processing units and wherein the interface of the optional transition region with the common volume is at a side surface of the common volume, the plurality of processing units optionally being arranged to have a row to column ratio (R/C) of about 0.2 to about 5.0, each of the plurality of processing units having one or more first process flow paths and one or more second process flow paths for performing mass exchange and optionally heat exchange between the one or more first process flow paths and the one or more second process flow paths, the processing units optionally being fuel cell stacks comprising a plurality of fuel cells, the one or more first process flow paths optionally comprising process flow paths of a plurality of fuel cell stacks; and operating the plurality of processing units to process at least a portion of the introduced gas in the one or more first process flow paths of the plurality of processing units, each of the plurality of processing units having a process flow path inlet pressure for the one or more first process flow paths, a coefficient of variation for the flow path inlet pressures of the plurality of processing units optionally being less than about 8.0%, wherein the at least a portion of introduced gas that is processed in the one or more first process flow paths of the plurality of processing units is passed from the common volume into the plurality of processing units without passing through an intervening manifold.

Embodiment 2

A method for processing a gas in a plurality of processing units, the processing units optionally comprising a plurality of fuel cells, comprising: optionally passing a gas from a conduit into an optional transition region, the optional transition region optionally having an expansion half-angle of about 15° to about 80°, the optional transition region being in fluid communication with the conduit and in fluid communication with a common volume, a width of the optional transition region at an interface with the common volume optionally being at least about 25% of a width of the common volume; introducing at least a portion of the gas from the conduit and/or the optional transition region into the common volume, the common volume containing a plurality of processing units, the plurality of processing units comprising a) at least about 20 processing units or b) at least about 8 processing units and wherein the interface of the optional transition region with the common volume is at a side surface of the common volume, the plurality of processing units optionally being arranged to have a row to column ratio (R/C) of about 0.2 to about 5.0, each of the plurality of processing units having one or more first process flow paths and one or more second process flow paths for performing mass exchange and optionally heat exchange between the one or more first process flow paths and the one or more second process flow paths, the processing units optionally being fuel cell stacks comprising a plurality of fuel cells, the one or more first process flow paths optionally comprising process flow paths of a plurality of fuel cell stacks; and operating the plurality of processing units to process at least a portion of the introduced gas in the one or more first process flow paths of the plurality of processing units, each of the plurality of processing units having a process flow path inlet pressure for the one or more first process flow paths, a coefficient of variation for the flow path inlet pressures of the plurality of processing units optionally being less than about 8.0%, wherein i) at least a second portion of gas is processed in the first process flow paths of one or more processing units of the plurality of processing units, the at least a second portion of gas being passed into the one or more processing units of the plurality of processing units by passing from the conduit through one or more intervening manifolds, the one or more intervening manifolds in combination being in direct fluid communication with less than all of the processing units in the plurality of processing units, ii) wherein the at least a portion of introduced gas that is processed in the first process flow paths of the plurality of processing units is passed from the common volume into the plurality of processing units without passing through an intervening manifold that is in direct fluid communication with all of the processing units of the plurality of processing units, or iii) a combination of i) and ii).

Embodiment 3

A method for processing a gas in a plurality of processing units, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume; introducing at least a portion of the gas from the transition region into the common volume, the common volume containing a plurality of processing units, each of the plurality of processing units having one or more first process flow paths and one or more second process flow paths for performing mass exchange and optionally heat exchange between the one or more first process flow paths and the one or more second process flow paths, the plurality of processing units comprising at least about 20 processing units, the plurality of processing units being arranged to have a row to column ratio (R/C) of about 0.2 to about 5.0; and operating the plurality of processing units to process at least a portion of the introduced gas in the one or more first process flow paths of the plurality of processing units, each of the plurality of processing units having a process flow path inlet pressure for the one or more first process flow paths, a coefficient of variation for the flow path inlet pressures of the plurality of processing units being less than about 8.0%, wherein the at least a portion of introduced gas that is processed in the one or more first process flow paths of the plurality of processing units is passed from the common volume into the plurality of processing units without passing through an intervening manifold.

Embodiment 4

A method for processing a gas in a plurality of processing units, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume, the interface of the transition region with the common volume being at a side surface of the common volume; introducing at least a portion of the gas from the transition region into the common volume, the common volume containing a plurality of processing units, each of the plurality of processing units having one or more first process flow paths and one or more second process flow paths for performing mass exchange and optionally heat exchange between the one or more first process flow paths and the one or more second process flow paths, the plurality of processing units comprising at least about 8 processing units, the plurality of processing units being arranged to have a row to column ratio (R/C) of about 0.2 to about 5.0; and operating the plurality of processing units to process at least a portion of the introduced gas in the one or more first process flow paths of the plurality of processing units, each of the plurality of processing units having a process flow path inlet pressure for the one or more first process flow paths, a coefficient of variation for the flow path inlet pressures of the plurality of processing units being less than about 8.0%; wherein the at least a portion of introduced gas that is processed in the one or more first process flow paths of the plurality of processing units is passed from the common volume into the plurality of processing units without passing through an intervening manifold.

Embodiment 5

A method for processing a gas in a plurality of fuel cells, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume; introducing at least a portion of the gas from the transition region into the common volume, the common volume containing a plurality of fuel cell stacks, each of the plurality of fuel cell stacks comprising a plurality of fuel cells, the plurality of fuel cell stacks comprising at least about 20 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein the at least a portion of introduced gas that is processed in the process flow paths of the plurality of fuel cell stacks is passed from the common volume into the plurality of fuel cell stacks without passing through an intervening manifold.

Embodiment 6

A method for processing a gas in a plurality of fuel cells, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume, the interface of the transition region with the common volume being at a side surface of the common volume; introducing at least a portion of the gas from the transition region into the common volume, the common volume containing a plurality of fuel cell stacks, each of the plurality of fuel cell stacks comprising a plurality of fuel cells, the plurality of fuel cell stacks comprising at least about 8 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein the at least a portion of introduced gas that is processed in the process flow paths of the plurality of fuel cell stacks is passed from the common volume into the plurality of fuel cell stacks without passing through an intervening manifold.

Embodiment 7

A method for processing a gas in a plurality of fuel cells, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume; introducing at least a portion of the gas from the transition region into the common volume, the common volume containing a plurality of fuel cell stacks, each of the plurality of fuel cell stacks comprising a plurality of fuel cells, the plurality of fuel cell stacks comprising at least about 20 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein at least a second portion of gas is processed in process flow paths of one or more fuel cell stacks of the plurality of fuel cell stacks, the at least a second portion of gas being passed into the one or more fuel cell stacks of the plurality of fuel cell stacks by passing from the conduit through one or more intervening manifolds, the one or more intervening manifolds in combination being in direct fluid communication with less than all of the fuel cell stacks in the plurality of fuel cell stacks.

Embodiment 8

A method for processing a gas in a plurality of fuel cells, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume, the interface of the transition region with the common volume being at a side surface of the common volume; introducing at least a portion of the gas from the transition region into the common volume, the common volume containing a plurality of fuel cell stacks, each of the plurality of fuel cell stacks comprising a plurality of fuel cells, the plurality of fuel cell stacks comprising at least about 8 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein at least a second portion of gas is processed in process flow paths of one or more fuel cell stacks of the plurality of fuel cell stacks, the at least a second portion of gas being passed into the one or more fuel cell stacks of the plurality of fuel cell stacks by passing from the conduit through one or more intervening manifolds, the one or more intervening manifolds in combination being in direct fluid communication with less than all of the fuel cell stacks in the plurality of fuel cell stacks.

Embodiment 9

The method of any of Embodiments 2, 7, or 8, wherein the intervening manifold is in fluid communication with about 75% or less of the fuel cell stacks in the plurality of fuel cell stacks, or about 50% or less, or about 33% or less, or about 25% or less.

Embodiment 10

A method for processing a gas in a plurality of fuel cells, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume; introducing at least a portion of the gas from the transition region into the common volume, the common volume containing a plurality of fuel cell stacks, each of the plurality of fuel cell stacks comprising a plurality of fuel cells, the plurality of fuel cell stacks comprising at least about 20 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein the at least a portion of introduced gas that is processed in the process flow paths of the plurality of fuel cell stacks is passed from the common volume into the plurality of fuel cell stacks without passing through an intervening manifold that is in direct fluid communication with all of the fuel cell stacks of the plurality of fuel cell stacks.

Embodiment 11

A method for processing a gas in a plurality of fuel cells, comprising: passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume, the interface of the transition region with the common volume being at a side surface of the common volume; introducing at least a portion of the gas from the transition region into the common volume, the common volume containing a plurality of fuel cell stacks, each of the plurality of fuel cell stacks comprising a plurality of fuel cells, the plurality of fuel cell stacks comprising at least about 8 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein the at least a portion of introduced gas that is processed in the process flow paths of the plurality of fuel cell stacks is passed from the common volume into the plurality of fuel cell stacks without passing through an intervening manifold that is in direct fluid communication with all of the fuel cell stacks of the plurality of fuel cell stacks.

Embodiment 12

The method of any of Embodiments 2, 8, or 9, wherein the at least a portion of introduced gas that is processed in the process flow paths of the plurality of fuel cell stacks is passed from the common volume into the plurality of fuel cell stacks without passing through an intervening manifold that is in direct fluid communication with at least about 75% of the fuel cell stacks in the plurality of fuel cell stacks, or at least about 50%, or at least about 33%, or at least about 25%.

Embodiment 13

The method of any of the above embodiments, wherein a ratio of coefficient of variation at the expansion half-angle of the transition region to a coefficient of variation at a minimum half angle is about 2.0 or less, or about 1.8 or less, or about 1.6 or less.

Embodiment 14

The method of any of the above embodiments, wherein the width of the transition region at the interface with the common volume is at least about 50% of the width of the common volume, or at least about 70%, or at least about 80%, or at least about 90%, or at least about 99%.

Embodiment 15

The method of any of the above embodiments, wherein the row to column ratio is about 0.5 to about 2.0, or wherein the expansion half-angle of the transition region is about 30° to about 70°, or a combination thereof.

Embodiment 16

The method of any of the above embodiments, wherein the width of the transition region at the interface with the common volume is at least about 50% of the width of the common volume, or at least about 70%, or at least about 80%, or at least about 90%, or at least about 99%.

Embodiment 17

A method for processing a gas in a plurality of fuel cells, comprising: introducing at least a portion of a gas from a conduit into a common volume, the common volume containing a plurality of fuel cell stacks, each of the plurality of fuel cell stacks comprising a plurality of fuel cells, the plurality of fuel cell stacks comprising at least about 20 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein the at least a portion of introduced gas that is processed in the process flow paths of the plurality of fuel cell stacks is passed from the common volume into the plurality of fuel cell stacks without passing through an intervening manifold.

Embodiment 18

A method for processing a gas in a plurality of fuel cells, comprising: introducing at least a portion of a gas from a conduit into a common volume at a side surface of the common volume, the common volume containing a plurality of fuel cell stacks, each of the plurality of fuel cell stacks comprising a plurality of fuel cells, the plurality of fuel cell stacks comprising at least about 8 fuel cell stacks, the plurality of fuel cell stacks being arranged to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%; wherein the at least a portion of introduced gas that is processed in the process flow paths of the plurality of fuel cell stacks is passed from the common volume into the plurality of fuel cell stacks without passing through an intervening manifold.

Embodiment 19

The method of any of the above embodiments, wherein the coefficient of variation for the flow path inlet pressures of the plurality of processing units or fuel cell stacks is less than about 6.0%, or less than about 5.0%.

Embodiment 20

The method of any of Embodiments 1-2 or 5-19, wherein the process flow paths of the plurality of fuel cell stacks comprise fuel cell cathodes.

Embodiment 21

The method of any of Embodiments 1-2 or 5-20, wherein each of the plurality of fuel cell stacks comprise a plurality of molten carbonate fuel cells.

Embodiment 22

The method of any of Embodiments 1-2 or 5-21, wherein the introduced gas comprises a $CO_2$-containing gas.

Embodiment 23

The method of Embodiment 22, wherein substantially all of the introduced $CO_2$-containing gas is processed in the cathodes of the plurality of fuel cell stacks.

Embodiment 24

The method of Embodiment 22 or 23, wherein the $CO_2$-containing gas comprises an exhaust gas from a combustion source.

Embodiment 25

The method of any of the above embodiments, wherein the gas in the conduit has a velocity of at least about 10.0 m/s, or at least about 15.0 m/s, or at least about 20.0 m/s.

Embodiment 26

The method of any of the above embodiments, wherein the introduced gas in the common volume has a superficial velocity of about 5.0 m/s or less, or about 3.0 m/s or less, or about 2.0 m/s or less.

Embodiment 27

The method of any of the above embodiments, wherein the plurality of processing units or the plurality of fuel cell stacks are arranged to have at least two rows of processing units or fuel cell stacks, or at least three rows of processing units or fuel cell stacks, or at least four rows of processing units or fuel cell stacks, wherein the plurality of processing units or the plurality of fuel cell stacks comprise at least about 25 processing units or fuel cell stacks, or at least about 35 processing units or fuel cell stacks, or at least about 45 processing units or fuel cell stacks, or a combination thereof.

Embodiment 28

The method of any of Embodiments 1-2 or 5-27, wherein an average direction of gas flow in the cathodes of the plurality of fuel cell stacks is substantially aligned with an average direction of gas flow in the common volume.

Embodiment 29

A system for processing a gas in a plurality of processing units, comprising: at least one conduit for delivering a gas; an optional transition region in fluid communication with the at least one conduit, the optional transition region optionally having an expansion half-angle of about 15° to about 80°; a common volume in fluid communication with the conduit and/or the optional transition region, a width of the optional transition region at an interface with the common volume being at least about 25% of a width of the common volume;

a plurality of processing units arranged within the common volume, the plurality of processing units optionally comprising a plurality of fuel cell stacks, the plurality of processing units being in fluid communication with the common volume without an intervening manifold, the plurality of processing units being arranged to have a row to column ratio of about 0.2 to about 5.0; a plurality of first process flow manifolds for passing first process flow exhaust streams from one or more first process flow paths of the plurality of processing units outside of the common volume; and a plurality of second process flow conduits for delivering second process flow input streams to the one or more second flow paths of the plurality of processing units and passing second process flow exhaust streams outside of the common volume.

Embodiment 30

A system for processing a gas in a plurality of processing units, comprising: at least one conduit for delivering a gas; an optional transition region in fluid communication with the at least one conduit, the optional transition region optionally having an expansion half-angle of about 15° to about 80°; a common volume in fluid communication with the conduit and/or the optional transition region, a width of the optional transition region at an interface with the common volume being at least about 25% of a width of the common volume; one or more optional intervening manifolds in fluid communication with the conduit and with one or more processing units of the plurality of processing units, the one or more optional intervening manifolds in combination optionally being in direct fluid communication with less than all of the fuel cell stacks in the plurality of fuel cell stacks, such as about 75% or less of the fuel cell stacks in the plurality of fuel cell stacks, or about 50% or less, or about 33% or less, or about 25% or less; a plurality of processing units arranged within the common volume, the plurality of processing units optionally comprising a plurality of fuel cell stacks, optionally at least a portion of the processing units being in fluid communication with the common volume without an intervening manifold, such as at least about 25% of the processing units in the plurality of processing units, or at least about 33%, or at least about 50%, or at least about 75%, the plurality of processing units being arranged to have a row to column ratio of about 0.2 to about 5.0; a plurality of first process flow manifolds for passing first process flow exhaust streams from one or more first process flow paths of the plurality of processing units outside of the common volume; and a plurality of second process flow conduits for delivering second process flow input streams to the one or more second flow paths of the plurality of processing units and passing second process flow exhaust streams outside of the common volume.

Embodiment 31

A system for processing a gas in a plurality of fuel cells, comprising: at least one conduit for delivering a gas; a transition region in fluid communication with the at least one conduit, the transition region having an expansion half-angle of about 15° to about 80°; a common volume in fluid communication with the transition region, a width of the transition region at an interface with the common volume being at least about 25% of a width of the common volume; a plurality of fuel cell stacks arranged within the common volume, the plurality of fuel cell stacks being in fluid communication with the common volume without an intervening manifold, the plurality of fuel cell stacks being arranged to have a row to column ratio of about 0.2 to about 5.0, each of the plurality of fuel cell stacks comprising a plurality of molten carbonate fuel cells, the cathodes of the plurality of molten carbonate fuel cells in each of the plurality of fuel cell stacks being substantially aligned with an average direction of flow in the common volume; a plurality of anode flow conduits for delivering anode input streams to anodes of the plurality of fuel cell stacks and passing anode exhaust streams outside of the common volume; and a plurality of cathode exhaust manifolds for passing cathode exhaust streams from the plurality of fuel cell stacks outside of the common volume.

Embodiment 32

A system for processing a gas in a plurality of fuel cells, comprising: at least one conduit for delivering a gas; a common volume in fluid communication with the at least one conduit; a plurality of fuel cell stacks arranged within the common volume, the fuel cell stacks being in fluid communication with the common volume without an intervening manifold, the plurality of fuel cell stacks being arranged to have a row to column ratio (R/C) of about 0.2 to about 5.0, each of the plurality of fuel cell stacks comprising a plurality of fuel cells, the plurality of fuel cell stacks comprising a) at least about 20 fuel cell stacks, or b) at least about 8 fuel cell stacks, the interface of the transition region with the common volume being at a side surface of the common volume; a plurality of anode flow conduits for delivering anode input streams to anodes of the plurality of fuel cell stacks and passing anode exhaust streams outside of the common volume; and a plurality of cathode exhaust manifolds for passing cathode exhaust streams from the plurality of fuel cell stacks outside of the common volume.

Embodiment 33

A system for processing a gas in a plurality of fuel cells, comprising: at least one conduit for delivering a gas; a transition region in fluid communication with the at least one conduit, the transition region having an expansion half-angle of about 15° to about 80°; a common volume in fluid communication with the transition region, a width of the transition region at an interface with the common volume being at least about 25% of a width of the common volume; one or more intervening manifolds in fluid communication with the conduit and with one or more fuel cell stacks of the plurality of fuel cell stacks, the one or more intervening manifolds in combination being in direct fluid communication with less than all of the fuel cell stacks in the plurality of fuel cell stacks, such as about 75% or less of the fuel cell stacks in the plurality of fuel cell stacks, or about 50% or less, or about 33% or less, or about 25% or less; a plurality of fuel cell stacks arranged within the common volume, at least a portion of the fuel cell stacks being in fluid communication with the common volume, the plurality of fuel cell stacks being arranged to have a row to column ratio (R/C) of about 0.2 to about 5.0, each of the plurality of fuel cell stacks comprising a plurality of fuel cells, the plurality of fuel cell stacks comprising a) at least about 20 fuel cell stacks, or b) at least about 8 fuel cell stacks, the interface of the transition region with the common volume being at a side surface of the common volume; a plurality of anode flow conduits for delivering anode input streams to anodes of the plurality of fuel cell stacks and passing anode exhaust streams outside of the common volume; and a plurality of cathode exhaust manifolds for passing cathode exhaust streams from the plurality of fuel cell stacks outside of the common volume.

Embodiment 34

A system for processing a gas in a plurality of fuel cells, comprising: at least one conduit for delivering a gas; a transition region in fluid communication with the at least one conduit, the transition region having an expansion half-angle of about 15° to about 80°; a common volume in fluid communication with the transition region, a width of the transition region at an interface with the common volume being at least about 25% of a width of the common volume; a plurality of fuel cell stacks arranged within the common volume, at least a portion of the fuel cell stacks being in fluid communication with the common volume without an intervening manifold, such as at least about 25% of the fuel cell stacks in the plurality of fuel cell stacks, or at least about 33%, or at least about 50%, or at least about 75%, the plurality of fuel cell stacks being arranged to have a row to column ratio (R/C) of about 0.2 to about 5.0, each of the plurality of fuel cell stacks comprising a plurality of fuel cells, the plurality of fuel cell stacks comprising a) at least about 20 fuel cell stacks, or b) at least about 8 fuel cell stacks, the interface of the transition region with the common volume being at a side surface of the common volume; a plurality of anode flow conduits for delivering anode input streams to anodes of the plurality of fuel cell stacks and passing anode exhaust streams outside of the common volume; and a plurality of cathode exhaust manifolds for passing cathode exhaust streams from the plurality of fuel cell stacks outside of the common volume.

Embodiment 35

The system of any of Embodiments 29-34, wherein a coefficient of variation for first process flow path inlet pressures of the plurality of processing units or process flow path inlet pressures of the plurality of fuel cell stacks is less than about 8.0%, or less than about 6.0%, or less than about 5.0%.

Embodiment 36

The method of Embodiment 35, wherein a ratio of coefficient of variation at the expansion half-angle to a coefficient of variation at a minimum half angle is about 2.0 or less, or about 1.8 or less, or about 1.6 or less.

Embodiment 37

The method of Embodiment 35 or 36, wherein the width of the transition region at the interface with the common volume is at least about 50% of the width of the common volume, or at least about 70%, or at least about 80%, or at least about 90%, or at least about 99%.

Embodiment 38

The method of any of Embodiments 29-31 or 33-37, wherein the row to column ratio is about 0.5 to about 2.0, or wherein the expansion half-angle of the transition region is about 30° to about 70°, or a combination thereof.

Embodiment 39

The method of any of Embodiments 29-31 or 33-38, wherein the width of the transition region at the interface with the common volume is at least about 50% of the width of the common volume, or at least about 70%, or at least about 80%, or at least about 90%, or at least about 99%.

Embodiment 40

The method of any of Embodiments 30-39, wherein the process flow paths of the plurality of fuel cell stacks comprise fuel cell cathodes.

Embodiment 41

The method of any of Embodiments 30-40, wherein each of the plurality of fuel cell stacks comprise a plurality of molten carbonate fuel cells.

Embodiment 42

The method of any of Embodiments 29-41, wherein the introduced gas comprises a $CO_2$-containing gas.

Embodiment 43

The method of Embodiment 42, wherein substantially all of the introduced $CO_2$-containing gas is processed in fuel cell cathodes of the plurality of fuel cell stacks.

Embodiment 44

The method of Embodiment 42 or 43, wherein the $CO_2$-containing gas comprises an exhaust gas from a combustion source.

Embodiment 45

The method of any of Embodiments 29-44, wherein the gas in the conduit has a velocity of at least about 10.0 m/s, or at least about 15.0 m/s, or at least about 20.0 m/s.

Embodiment 46

The method of any of Embodiments 29-45, wherein the introduced gas in the common volume has a superficial velocity of about 5.0 m/s or less, or about 3.0 m/s or less, or about 2.0 m/s or less.

Embodiment 47

The method of any of Embodiments 29-46, wherein the plurality of processing units or the plurality of fuel cell stacks are arranged to have at least two rows of processing units or fuel cell stacks, or at least three rows of processing units or fuel cell stacks, or at least four rows of processing units or fuel cell stacks, wherein the plurality of processing units or the plurality of fuel cell stacks comprise at least about 25 processing units or fuel cell stacks, or at least about 35 processing units or fuel cell stacks, or at least about 45 processing units or fuel cell stacks, or a combination thereof.

Embodiment 48

The method of any of Embodiments 30-47, wherein an average direction of gas flow in the cathodes of the plurality of fuel cell stacks is substantially aligned with an average direction of gas flow in the common volume.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for processing a gas in a plurality of fuel cells, comprising:

passing a gas from a conduit into a transition region, the transition region having an expansion half-angle of about 15° to about 80°, the transition region being in fluid communication with the conduit and in fluid communication with a common volume, a width of the transition region at an interface with the common volume being at least about 25% of a width of the common volume, the interface of the transition region with the common volume being at a side surface of the common volume;

introducing at least a portion of the gas from the transition region into the common volume, the common volume containing a plurality of fuel cell stacks, each of the plurality of fuel cell stacks comprising a plurality of fuel cells, the plurality of fuel cell stacks comprising at least about 8 fuel cell stacks, the plurality of fuel cell stacks being arranged to comprise a plurality of rows and a plurality of columns, and to have a row to column ratio (R/C) of about 0.2 to about 5.0; and operating the plurality of fuel cell stacks to process at least a portion of the introduced gas in process flow paths of the plurality of fuel cell stacks, each of the plurality of fuel cell stacks having a process flow path inlet pressure, a coefficient of variation for the flow path inlet pressures of the plurality of fuel cell stacks being less than about 8.0%;

wherein the at least a portion of introduced gas that is processed in the process flow paths of the plurality of fuel cell stacks is passed from the common volume into the plurality of fuel cell stacks without passing through an intervening manifold.

2. The method of claim 1, wherein a) the process flow paths of the plurality of fuel cell stacks comprise fuel cell cathodes, b) the plurality of fuel cell stacks comprise a plurality of molten carbonate fuel cells, c) the introduced gas comprises a $CO_2$-containing gas, d) substantially all of the introduced gas is processed in the process flow paths of the plurality of fuel cell stacks, e) a combination of two or more of a)-d), or f) a combination of all of a)-d).

3. The method of claim 1, wherein the plurality of fuel cell stacks are arranged to have at least three rows of fuel cell stacks, or at least four rows of fuel cell stacks.

4. The method of claim 1, wherein the plurality of fuel cell stacks comprise at least about 25 fuel cell stacks, or at least about 35 fuel cell stacks, or at least about 45 fuel cell stacks.

5. The method of claim 1, wherein the row to column ratio is about 0.5 to about 2.0.

6. The method of claim 1, wherein the expansion half-angle of the transition region is about 30° to about 70°.

7. The method of claim 1, wherein the width of the transition region at the interface with the common volume is at least about 50% of the width of the common volume, or at least about 70%, or at least about 80%, or at least about 90%, or at least about 99%.

8. The method of claim 1, wherein an average direction of gas flow in the cathodes of the plurality of fuel cell stacks is substantially aligned with an average direction of gas flow in the common volume.

* * * * *